(12) United States Patent
Nakao

(10) Patent No.: US 6,711,505 B2
(45) Date of Patent: Mar. 23, 2004

(54) METHOD AND APPARATUS FOR DETECTING ABNORMALITIES OF TIRE, AND PROGRAM FOR DETECTING ABNORMALITIES OF TIRE

(75) Inventor: Yukio Nakao, Kobe (JP)

(73) Assignee: Sumitmo Rubber Industries, Ltd., Kobe (JP)

(*) Notice: Subject to any disclaimer, the term of this patent is extended or adjusted under 35 U.S.C. 154(b) by 9 days.

(21) Appl. No.: 10/225,497

(22) Filed: Aug. 22, 2002

(65) Prior Publication Data
US 2003/0065455 A1 Apr. 3, 2003

(30) Foreign Application Priority Data

Aug. 22, 2001 (JP) .......................... 2001-251549
Dec. 26, 2001 (JP) .......................... 2001-394585

(51) Int. Cl.⁷ .............................. G01P 3/00; G06F 19/00
(52) U.S. Cl. ......................................... 702/34; 702/145
(58) Field of Search .............................. 702/34, 35, 36, 702/66, 70, 71, 114, 142, 145; 73/146, 146.1, 146.2; 340/442, 443, 444

(56) References Cited

U.S. PATENT DOCUMENTS 5,218,862 A * 6/1993 Hurrell et al. ............. 73/146.5
5,248,957 A * 9/1993 Walker et al. ............. 340/444
5,343,741 A * 9/1994 Nishihara et al. .......... 73/146.2
5,561,415 A * 10/1996 Dieckmann ................ 340/444

FOREIGN PATENT DOCUMENTS

| EP | 0826526 A2 | 3/1998 |
| JP | 63-305011 | 12/1988 |
| JP | 08-132831 | 5/1996 |
| JP | 2000-158923 | 6/2000 |
| JP | 2000-238516 | 9/2000 |

* cited by examiner

Primary Examiner—Bryan Bui
(74) Attorney, Agent, or Firm—Birch, Stewart Kolasch & Birch, LLP

(57) ABSTRACT

A method for detecting abnormalities of a tire which detects abnormalities of a tire on the basis of rotational information obtained from tires attached to wheels of a vehicle. The method includes the steps of: detecting rotational pulses of wheels of the tires, calculating and storing rotational information of the tires on the basis of the rotational pulses, calculating and processing fluctuations in rotational pulse intervals in a single rotation of the tires on the basis of the rotational information, and storing data during driving which have been processed for each single rotation and performing prediction of abnormalities of a tire on the basis of changes in the data. Irregularities in rotational information of rotational pulses in a single rotation of the tires are detected for predicting a danger of abnormalities occurring to the tires to thus enable safe driving.

18 Claims, 8 Drawing Sheets

METHOD AND APPARATUS FOR DETECTING ABNORMALITIES OF TIRE, AND PROGRAM FOR DETECTING ABNORMALITIES OF TIRE

BACKGROUND OF THE INVENTION

The present invention relates to a method and apparatus for detecting abnormalities of a tire and a program for detecting abnormalities of a tire. More particularly, it relates to a method and apparatus for detecting abnormalities of a tire and a program for detecting abnormalities of a tire capable of predicting dangers of abnormalities occurring to a tire and thus enabling safe driving.

Methods or apparatuses for detecting decrease in internal pressure of a tire have been conventionaly suggested as methods for preventing troubles from occurring to tires of a running vehicle. For instance, Japanese Unexamined Patent Publication No. 305011/1988 discloses a method for detecting a decrease in internal pressure on the basis of differences between two diagonal sums of rotational velocities of front wheel tires and rear wheel tires. Japanese Unexamined Patent Publication No. 158923/2000 further discloses an apparatus for directly measuring internal pressures of tires through sensors and accordingly issuing alarm when it is determined that some abnormal condition is present.

However, it is impossible to acquire information during driving other than a decrease in internal pressure of a tire, for example, that an urgent abnormality has occurred to a tire or is likely to occur to a tire. The driver needs to be immediately informed in case a danger exists that a tire might burst owing to sudden damages or overload.

Detecting abnormalities of tires at an early stage is not a sufficient measure of safety in view of prevention and safety, while it might be provided satisfactory prevention and safety in case it would be possible to detect that the running condition might lead to occurrences of abnormalities of tires.

SUMMARY OF THE INVENTION

The present invention has been made in view of the above facts, and it is an object thereof to provide a method and apparatus for detecting abnormalities of a tire and a program for detecting abnormalities of a tire capable of predicting dangers of abnormalities occurring to a tire and thus enabling safe driving.

In accordance with a first aspect of the present invention, there is provided a method for detecting abnormalities of a tire which detects abnormalities of a tire on the basis of rotational information obtained from tires attached to wheels of a vehicle, including the steps of: detecting rotational pulses of wheels of the tires, calculating and storing rotational information of the tires on the basis of the rotational pulses, calculating and processing fluctuations in rotational pulse intervals in a single rotation of the tires on the basis of the rotational information, and storing data during driving which have been processed for each single rotation and performing prediction of abnormalities of a tire on the basis of changes in the data.

In accordance with a second aspect of the present invention, there is provided an apparatus for detecting abnormalities of a tires which detects abnormalities of a tire on the basis of rotational information obtained from tires attached to wheels of a vehicle, including: a rotational information detecting means for detecting rotational pulses of wheels of the tires; a calculating and storing means for calculating and storing rotational information of the tires on the basis of the rotational pulses; a processing means for calculating and processing fluctuations in rotational pulse intervals in a single rotation of the tires on the basis of the rotational information; and an abnormality detecting means for storing data during driving which have been processed for each single rotation and performing predictions of abnormalities of a tire on the basis of changes in the data.

In accordance with a third aspect of the present invention, there is provided a program for detecting abnormalities of a tire, which makes a computer function, for predicting abnormal conditions of a tire, as a calculating and storing means for calculating and storing rotational information of tires on the basis of the rotational pulses, a processing means for calculating and processing fluctuations in rotational pulse intervals in a single rotation of the tires on the basis of the rotational information, and an abnormality detecting means for storing data during driving which have been processed for each single rotation and performing predictions of abnormalities of a tire on the basis of changes in the data.

In accordance with a fourth aspect of the present invention, there is provided a method for detecting abnormalities of a tire which detects abnormalities of a tire on the basis of rotational information obtained from tires attached to wheels of a vehicle, including the steps of: detecting rotational pulses of wheels of the respective tires; calculating and storing rotational information of the tires on the basis of the rotational pulses; comparing whether a running speed of the vehicle is not more than a reference speed or not; calculating and processing an amount of fluctuations in rotational pulse intervals in a single rotation of the tires on the basis of the rotational information; comparing, in case the running speed of the vehicle is not more than the reference speed, the processed data with a specified reference value to determine whether the data fall within a preliminarily set range for the data; and predicting, on the basis of the determination of the comparison, that a danger exists that abnormalities are likely to occur to a tire during high speed running and accordingly issuing an alarm.

In accordance with a fifth aspect of the present invention, there is provided a method for detecting abnormalities of a tire which detects abnormalities of a tire on the basis of rotational information obtained from tires attached to wheels of a vehicle, including the steps of: detecting rotational pulses of wheels of the respective tires; calculating and storing rotational information of the tires on the basis of the rotational pulses; comparing whether a running speed of the vehicle is not more than a reference speed or not; calculating and processing an amount of fluctuations in rotational pulse intervals in a single rotation of the tires on the basis of the rotational information; storing data during driving that have been processed for each single rotation; comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; and predicting, on the basis of the determination of the comparison, that a danger exists that abnormalities are likely to occur to a tire during high speed running and accordingly issuing an alarm.

In accordance with a sixth aspect of the present invention, there is provided an apparatus for detecting abnormalities of a tire which detects abnormalities of a tire on the basis of rotational information obtained from tires attached to wheels of a vehicle, including: a detecting means for detecting rotational pulses of wheels of the respective tires; a calculating and storing means for calculating and storing rotational information of the tires on the basis of the rotational pulses; a speed comparing means for comparing whether a running speed of the vehicle is not more than a reference speed or not; a fluctuation processing means for calculating and processing an amount of fluctuations in rotational pulse intervals in a single rotation of the tires on the basis of the rotational information; a reference value comparing means for comparing the processed data with a specified reference value for determining, in case the running speed of the vehicle is not more than the reference speed, whether the data fall within a preliminarily set range for the data; an abnormality predicting means for predicting, on the basis of the determination of the comparison, that a danger exists that abnormalities are likely to occur to a tire when performing high speed running; and an alarming means for issuing an alarm.

In accordance with a seventh aspect of the present invention, there is provided an apparatus for detecting abnormalities of a tire which detects abnormalities of a tire on the basis of rotational information obtained from tires attached to wheels of a vehicle, including: a detecting means for detecting rotational pulses of wheels of the respective tires; a calculating and storing means for calculating and storing rotational information of the tires on the basis of the rotational pulses; a speed comparing means for comparing whether a running speed of the vehicle is not more than a reference speed or not; a fluctuation processing means for calculating and processing an amount of fluctuations in rotational pulse intervals in a single rotation of the tires on the basis of the rotational information; a storing means for storing data which have been processed for each single rotation during running; a threshold comparing means for comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; an abnormality announcing means for predicting, on the basis of the determination of the comparison, that a danger exists that abnormalities are likely to occur to a tire when performing high speed running; and an alarming means for issuing an alarm.

In accordance with an eighth aspect of the present invention, there is provided a program for detecting abnormalities of a tire, which makes a computer function, for predicting abnormal conditions of tires, as a calculating and storing means for calculating and storing rotational information of the tires on the basis of the rotational pulses; a speed comparing means for comparing whether a running speed of the vehicle is not more than a reference speed or not; an fluctuation processing means for calculating and processing an amount of fluctuations in rotational pulse intervals in a single rotation of the tires on the basis of the rotational information; a reference value comparing means for comparing the processed data with a specified reference value in case the running speed of the vehicle is not more than the reference speed, whether the processed data fall within a preliminarily set range for the data or not; and an abnormality predicting means for predicting, on the basis of the determination of the comparison, that a danger exists that abnormalities are likely to occur to a tire when performing high speed running, and issuing an alarm.

In accordance with a ninth aspect of the present invention, there is provided a program for detecting abnormalities of a tire, which makes a computer function, for predicting abnormal conditions of tires, as a calculating and storing means for calculating and storing rotational information of the tires on the basis of the rotational pulses; a speed comparing means for comparing whether a running speed of the vehicle is not more than a reference speed or not; a fluctuation processing means for calculating and processing an amount of fluctuations in rotational pulse intervals in a single rotation of the tires on the basis of the rotational information; a storing means for storing processed data per single rotation during running; a threshold comparing means for comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; and an abnormality predicting means for predicting, on the basis of the determination of the comparison, that a danger exists that abnormalities are likely to occur to a tire when performing high speed running and accordingly issuing an alarm.

DETAILED DESCRIPTION

The method and apparatus for detecting abnormalities of a tire and the program for detecting abnormalities of a tire of the present invention will now be explained with reference to the accompanying drawings.

Figure 1:
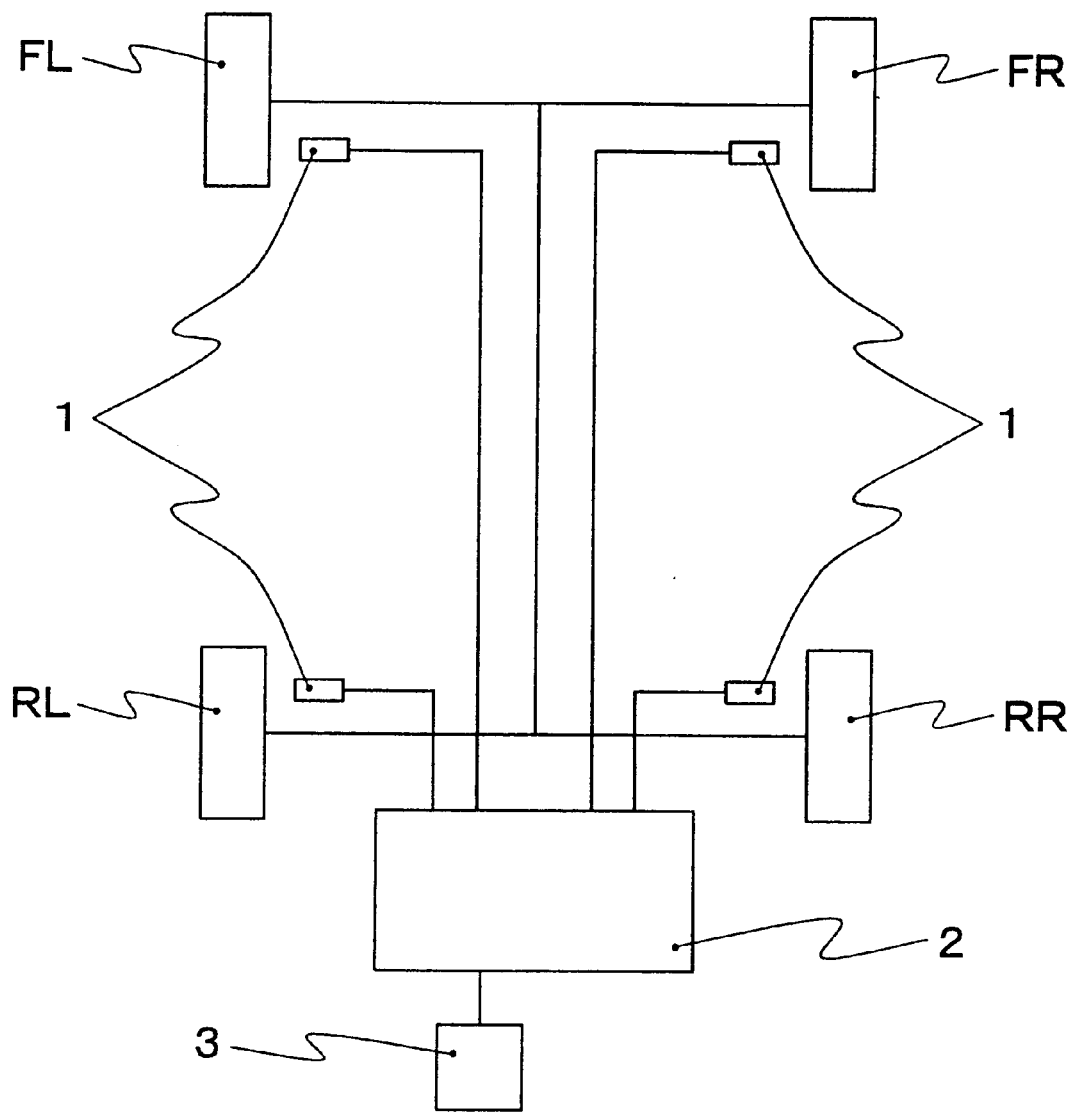
FIG. 1 is a block diagram for illustrating one embodiment of the apparatus for detecting abnormalities of a tire according to the present invention.

As illustrated in FIG. 1, the apparatus for detecting abnormalities of a tire is for detecting abnormalities of a tire on the basis of rotational information obtained from tires FL, FR, RL and RR attached to wheels of the vehicle or for predicting that there exists the danger that abnormalities might occur to a tire when performing high speed running and accordingly issuing alarm, and includes ordinary rotation information detecting sensors 1 which are provided as rotational information detecting means in relation with the tires FL, FR, RL and RR, respectively. The rotational information detecting sensors 1 might be composed of electromagnetic pickups. Each wheel is provided with a rotor with a plurality of, for instance, 48 gears, on an outer periphery thereof. With this arrangement, sinusoidal analog signals (voltage signals that periodically change) as issued from the wheel speed sensors 1 provided on each of the four wheels are extracted from signal lines provided for each of them and are further input as rotational pulses of rotational velocity signals which have been shaped as square waves through a binary circuit (not shown) of a waveform shaper. The rotational information detecting sensors 1 are connected, via the waveform shaper, to an I/O interface 2a which serves as an input/output device of a control unit 2 composed of a computer. An alarm device 3 composed of either liquid crystal elements, plasma display elements or CRT and a sound circuit for informing a driver that abnormalities have occurred are likely to occur on either of the tires of FL, FR, RL and RR are connected to the control unit 2.

Figure 2:
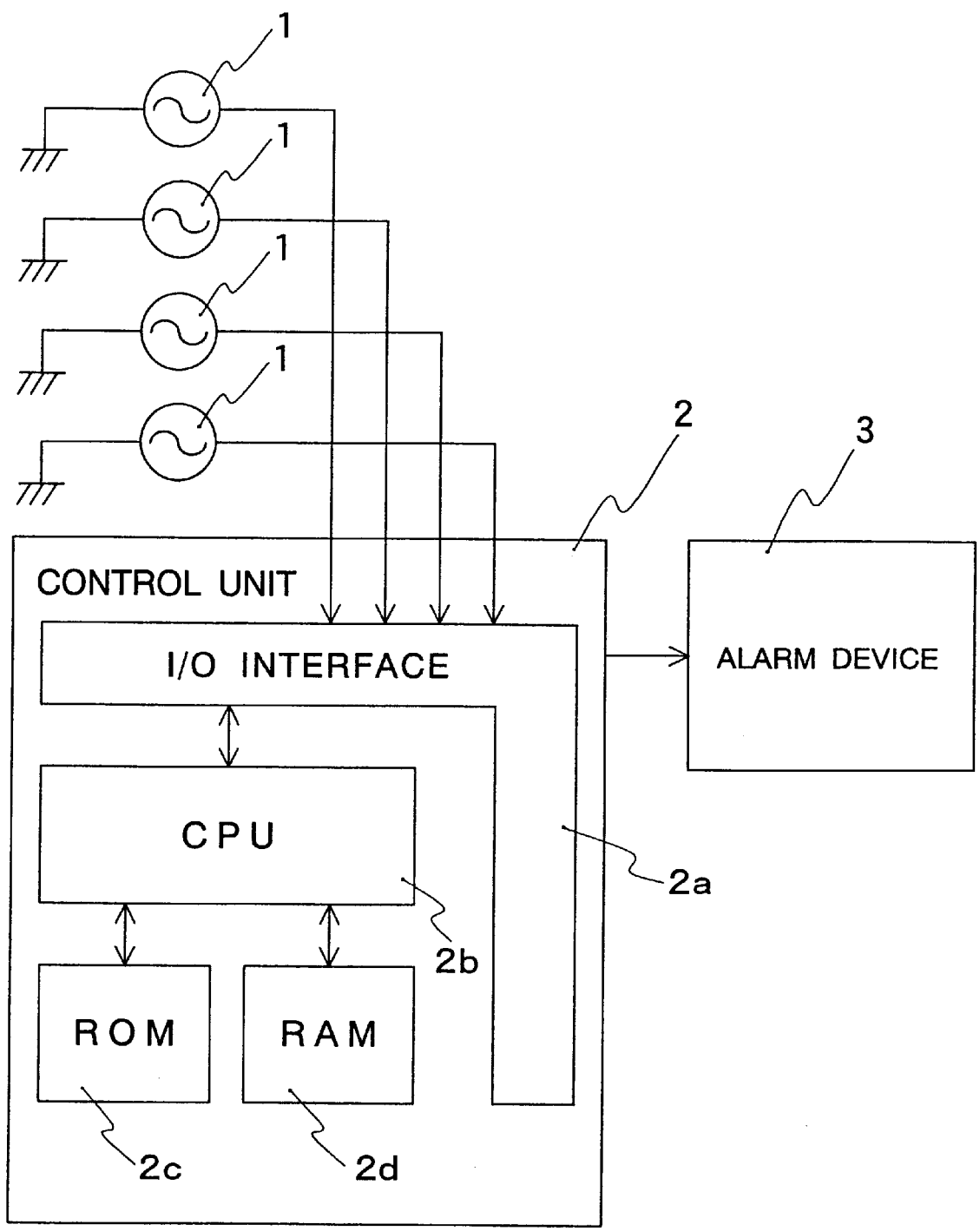
FIG. 2 is a block diagram for illustrating electric arrangements of the apparatus for detecting abnormalities of the tire of FIG. 1.

The control unit 2 comprises, as illustrated in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

The apparatus of the present embodiment comprises the wheel speed sensors 1, a calculating and storing means for calculating and storing rotational pulses in a single rotation corresponding to the number of gears of the rotor which represent rotational information of the tire on the basis of the rotational pulses of the wheels of the tires, a processing means for calculating and processing an amount of fluctuations in rotational pulse intervals in a single rotation of the tires on the basis of the rotational information and an abnormality detecting means for storing data which have been processed for each single rotation during running and performing predictions of abnormalities of tires on the basis of changes in the data.

The program for predicting abnormalities of a tire according to this embodiment is so arranged that the control unit 2 is made to function as the calculating and storing means for calculating and storing rotational information of tires from the wheel speed sensors 1, the processing means for calculating and processing an amount of fluctuations in rotational pulse intervals in a single rotation of the tires on the basis of the rotational information and the abnormality detecting means for storing data which have been processed for each single rotation during running and performing predictions of abnormalities of tires on the basis of changes in the data.

The calculating step for the amount of fluctuations in rotational pulse intervals might be such that a time interval $t_n$ from start-up of a single rotational pulse to start-up of the next rotational pulse is measured at a measuring accuracy of, for instance, 0.1 $\mu$sec wherein this measurement is made for the entire single rotation (48 gears) for calculating an amount of fluctuations in the rotational velocity within a single rotation of the tires.

Processing of the amount of fluctuations in the rotational pulse intervals means to detect irregularities in the rotational velocity within a single rotation of the tires on the basis of waveform fluctuations in rotational velocity signals of the wheels. For instance, process steps performed for indexing them as irregularities in rotation within a single rotation of the tires include setting the time interval $t_1$ of a first pulse as a reference, performing division of all following time intervals ($t_2, \ldots, t_{48}$) and expressing the amount of fluctuation in percentages for indexing the same as irregularities in rotations.

In the present embodiment, rotational pulses of tires of the running vehicle are detected for all of the four wheels which are input as rotational information of individual tires, an amount of fluctuations in rotational pulse intervals within a single rotation of the tires are detected on the basis of the rotational information of the individual tires which are then indexed as irregularities in rotations in a single rotation of the tires, and the irregularities in rotations of tires of the running vehicle are observed to predict, on the basis of the changes in the irregularities in rotations, whether abnormalities have occurred or is likely to occur to a tire and the driver is accordingly informed to be capable of performing safe driving. With this arrangement, accidents caused through abnormalities in tires can be prevented. By employing ABS wheel speed sensors as the wheel speed sensors 1, conditions of the tires might be detected on the basis of the rotational pulses of the sensors so that it is not necessary to provide any additional equipment.

It should be noted that for accurately acquiring information concerning irregularities in rotations which are the data processed per single rotation, it is preferable to store data when running at a constant speed, for instance, such data under a condition in which the acceleration of the vehicle $|G|<0.1$ is satisfied.

Changes in irregularities in rotations are obtained preferably by employing, for instance, (1) a waveform processing means for calculating actual values of differences obtained by comparing waveforms and comparing the same with a reference value, (2) a waveform processing means for calculating degrees of differences between maximum values and minimum values and comparing the same, or (3) a waveform processing means for performing analysis of degrees accompanying the rotation for comparing the degree components. Analysis of degrees is performed by regarding a periodic component of a single rotation of the tire as a reference, regarding a sine component which is changed once during a single rotation as a primary component, and regarding a sine component which is changed twice during a single rotation as a secondary component, and in an exemplary case in which the internal pressure of a tire (tire dimension: 275/70R16) is set to 140 kPa and is made to run for 10 minutes at 120 km/h, the degree component of irregularities in rotations during a single rotation of the tire will be 0.13% for the primary component (approximately 9 Hz) and 0.05% for the secondary component (approximately 18 Hz). In contrast thereto, the degree components of irregularities in rotations in case the tire has been made to run for another 60 minutes at 120 km/h and is close to burst (approximately 20 seconds in advance of the burst) will both be increased with the primary component being 0.21% and the second component being 0.12%.

For obtaining changes in irregularities of rotations, it is also possible to employ a comparing means for comparing values with preliminarily set numerical values such as P—P values (peak-to-peak amplitude values) or prescribed values of degree components.

When performing prediction of abnormalities of tires, prediction of occurrences of abnormalities to tires can be precisely performed by additionally taking influences of running speed of the vehicle into consideration in order to further improve the accuracy of judgment. The object thereof is to prevent occurrences of erroneous alarms on rough road surfaces by taking into consideration that variations in rotational velocities of the tires are influenced by road surface conditions and that high speed running is limited to speedways of which road surfaces are relatively smooth.

Figure 3:
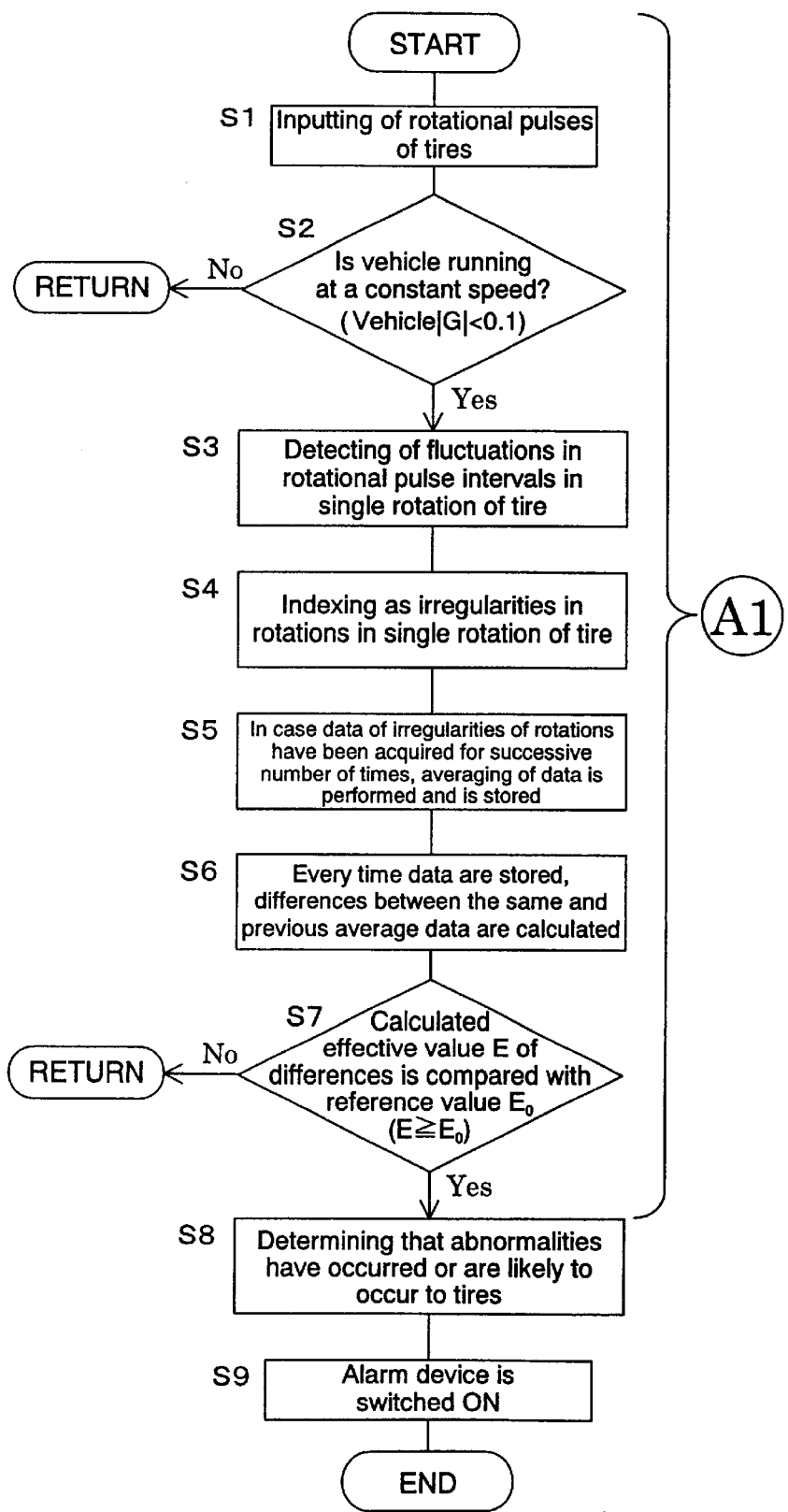
FIG. 3 is an example of a flowchart according to one embodiment of the present invention.

The method for detecting abnormalities of a tire according to the present invention will now be explained with reference to FIGS. 3 to 5. As illustrated in FIG. 3, wheel speed signals of the wheels are first detected whereupon rotational pulses of the tires of the vehicle are input to the CPU (Step S1). It is then determined whether the vehicle is running at a constant speed or not, and in case it is regarded that the acceleration of the vehicle satisfies $|G|<0.1$, an amount of fluctuations in rotational pulse intervals in a single rotation of a tire are detected (Steps S2, S3). The fluctuations are indexed as irregularities in rotations in a single rotation of the tire (Step S4). In case data of irregularities of rotations have been acquired for a successive number of times, averaging of data corresponding to, for instance, 10 times is performed and accordingly stored, and every time data are stored, differences between the same and the previous average data are calculated (Steps S5, S6). For instance, on the basis of index values corresponding to respective irregularities of rotations of all of the 48 gears, differences between previous values and present values of respectively corresponding portions are obtained. 48 differences of irregularities of rotation will accordingly put into numerical forms. By summing up absolute values of the 48 differences, an effective value E of the differences of irregularities of rotations will be calculated.

The calculated effective value E of the differences is compared with the reference value $E_0$, which might be an actually measured value $E_0$ of differences when running was preliminarily performed at an appropriate internal pressure and an appropriate load on various road surfaces, and in case it is determined that $E \geq E_0$ is satisfied, it is determined that abnormalities have occurred or are likely to occur to the tires so that the alarm device is switched ON and an alarm is issued to the driver (Steps S7, S8 and S9).

Figure 4:
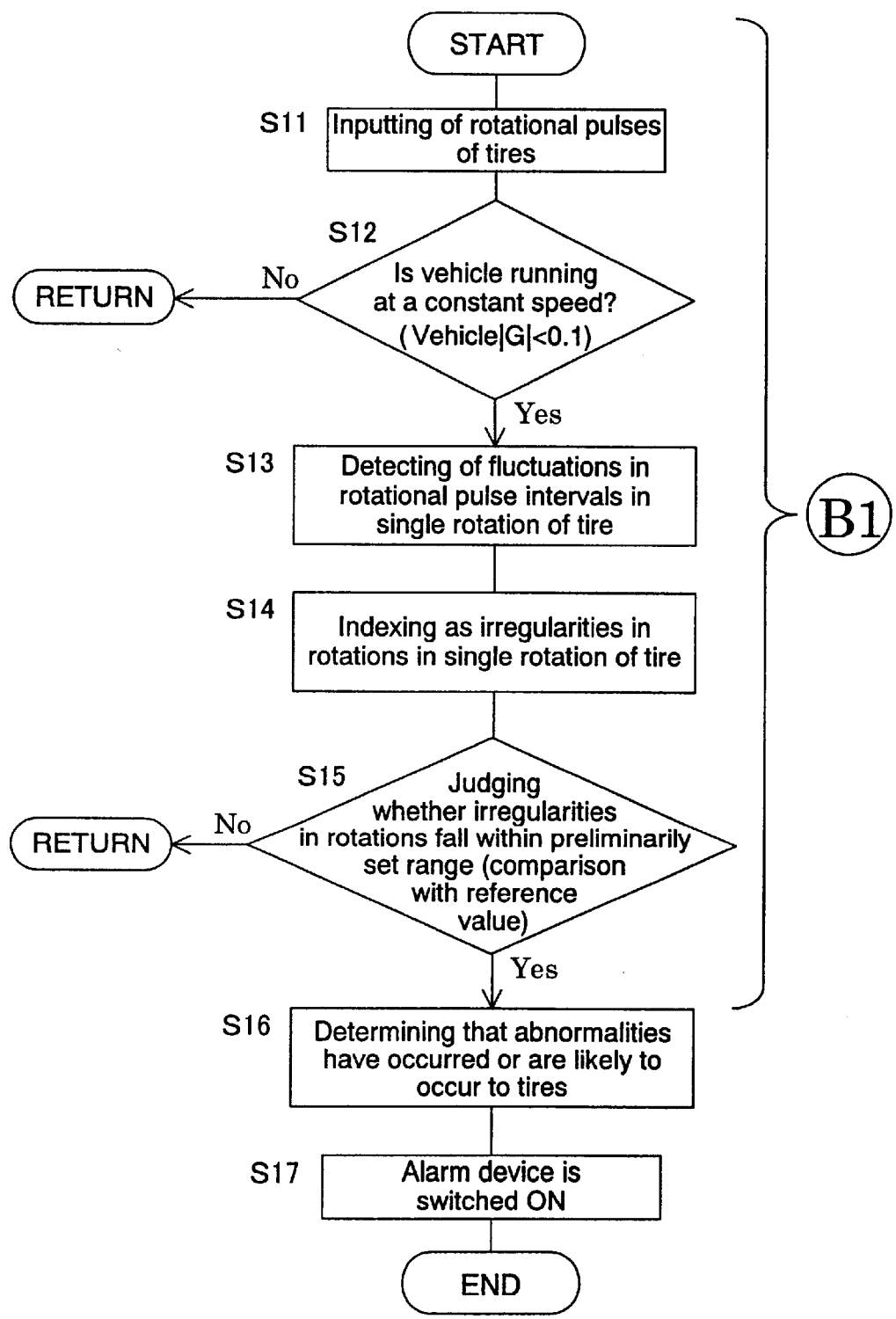
FIG. 4 is another example of a flowchart according to one embodiment of the present invention.

As alternatively illustrated in FIG. 4, rotational pulses of tires of the vehicle are input similarly to Steps S1 to S4 of the process steps of FIG. 3, and indexing of an amount of fluctuations in rotational pulse intervals is performed as irregularities in rotations (Steps S11 to S14). It is then judged whether the obtained irregularities in rotations fall within a preliminarily set range for the irregularities in rotations (Step S15). For instance, analysis of rotational degrees is performed for a single rotation (48 gears) for calculating actual values from primary to fifth-degree components. It is then compared whether either one of these exceeds a threshold which is determined from respective values of degree components, which is a prescribed value (reference value) for the degree components, upon preliminarily performing running at appropriate internal pressure and appropriate load, and in case the threshold has been exceeded, it is determined that abnormalities have occurred or are likely to occur to a tire so that the alarm device is switched ON and an alarm is issued to the driver (Steps S16, S17).

Figure 5:
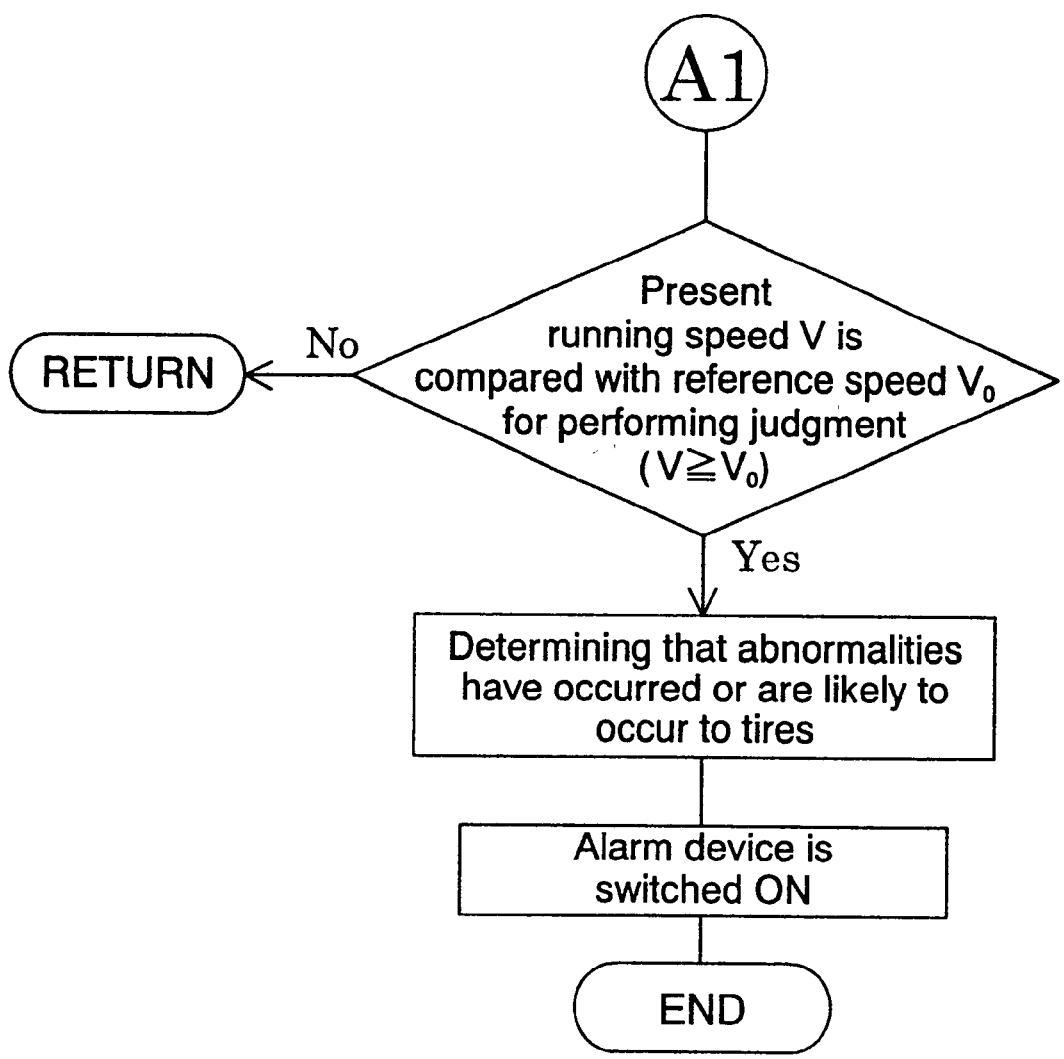
FIG. 5 is still another example of a flowchart according to one embodiment of the present invention.

As further illustrated in FIG. 5, the running speed of the vehicle is added to process step A1 as illustrated in FIG. 3 as a reference for judgment. This is performed with regards to both, perception of danger and elimination of erroneous alarm since abnormalities are most likely to occur to tires when performing high speed running.

Similarly to process step A1, the calculated effective value E of the differences is compared with the reference value $E_0$ (Steps S1 to S7) whereupon the present running speed V is compared to a reference speed $V_0$ for performing judgment (for instance, 100 km/h), and in case $V \geq V_0$ is satisfied, it is determined, similar to the above Steps S8 and S9, that abnormalities have occurred or are likely to occur to a tire so that the alarm device is switched ON and an alarm is issued to the driver.

It should be noted that the method for adding influences of running speed as employed in the present invention is not limited to the process step A1 in which, for instance, the calculated effective value E of the differences is compared with the reference value $E_0$, and it is alternatively possible to add influences of running speeds to the process step B1 for performing judgment whether the obtained values fall within the preliminarily set range for the irregularities of rotations.

Such calculations are performed for all of the tires of the four wheels, and when abnormalities are detected, signals can be generated for designating a position at which the tire in question is attached (FL, FR, RL and RR) in addition to the alarm of abnormalities.

Another embodiment of the present invention will now be explained. In the present embodiment, no abnormalities of a tire are detected and alarmed at an early stage but it is predicted that a tire is under a running condition to which abnormalities are likely to occur, that is, a high-load condition and an alarm is accordingly issued, for which purpose the apparatus comprises wheel speed sensors 1 for detecting rotational pulses of wheels of the respective tires, a calculating and storing means for calculating and storing rotational information of tires on the basis of the rotational pulses, a speed comparing means for comparing whether the running speed of the vehicle is not more than a reference speed or not, a fluctuation processing means for calculating and processing an amount of fluctuations in rotational pulse intervals in a single rotation of the tires on the basis of the rotational information, a reference value comparing means for comparing the processed data with a specified reference value for determining, in case the running speed of the vehicle is not more than the reference speed, whether the data fall within a preliminarily set range for the data, an abnormality announcing means for predicting, on the basis of the determination of the comparison, that a danger exists that abnormalities are likely to occur to a tire when performing high speed running and accordingly issuing alarm, and the alarm apparatus 3 which functions as an alarming means for generating alarm.

It is possible to replace the reference value comparing means with a storing means for storing data which have been processed for each single rotation during running and a threshold comparing means for comparing a compared value, which has been obtained by comparing fluctuations in rotational pulse intervals in a single rotation of the tires at the time the vehicle performs low speed running with the stored data, with a threshold for indicating a load condition of the tire.

It is further possible to provide a second speed comparing means for comparing whether the running speed of the vehicle has exceeded a reference for high-speed running and a second abnormality announcing means for predicting heavy dangers so as to terminate high-speed running in case the running speed of the vehicle exceeds the reference for high-speed running.

The program for detecting occurrence of abnormalities to a tire according to the present invention is so arranged that the control unit 2 is made to function as the calculating and storing means for calculating and storing rotational information of tires on the basis of the rotational pulses, the speed comparing means for comparing whether the running speed of the vehicle is not more than a reference speed or not, the fluctuation processing means for calculating and processing an amount of fluctuations in rotational pulse intervals in a single rotation of the tires on the basis of the rotational information, the reference value comparing means for comparing the processed data with a specified reference value for determining, in case the running speed of the vehicle is not more than the reference speed, whether the data fall within a preliminarily set range for the data, and the abnormality announcing means for predicting, on the basis of the determination of the comparison, that a danger exists that abnormalities are likely to occur to a tire when performing high speed running and accordingly issuing an alarm.

The program for detecting abnormalities of a tire might make the control unit function as the storing means and the threshold comparing means instead of the reference value comparing means.

The control unit might also be made to function as the second speed comparing means for comparing whether the running speed of the vehicle has exceeded a reference for high-speed running or not and the second abnormality announcing means for predicting heavy dangers in case the running speed of the vehicle has exceeded the reference for high-speed running so as to terminate high-speed running.

According to the present embodiment, fluctuations in rotational pulse (rotational angular velocity signal) intervals within a single rotation of the tire are obtained for detecting irregularities in rotations. The level of load conditions of the tires is estimated on the basis of the information related to the irregularities in rotations and an alarm is issued when the load condition is high so that it is possible to prevent troubles from occurring to any of the tires. Thus, by setting the conditions of use of the tires within appropriate ranges, factors for causing troubles to tires can be fundamentally eliminated and accidents owing to abnormalities of tires can be prevented. It should be noted that when employing ABS wheel speed sensors as the wheel speed sensors 1, conditions of tires can be detected on the basis of the rotational pulses obtained from the sensors so that it is not necessary to provide any additional equipment.

The specified reference value is obtained by storing data of irregularities in rotations which represent an amount of fluctuations in rotational pulse intervals when a vehicle was preliminarily made to perform straight-ahead running at constant speed of, for instance, 40 km/h average at normal internal pressure and in a normal load condition and by performing averaging thereof. The reference value is stored in the CPU.

It should be noted that load bearing capacities of tires are set for respective sizes depending on the internal pressure of use. A corresponding chart between air-pressure and load capacity is published in the yearbook (of 2001) of the Japan Automobile Tire Association (JATMA) from which recommended internal pressures and load capacities corresponding thereto can be found.

Load conditions of tires according to the present invention are obtained by calculating load capacities of arbitrary tire air-pressures from the corresponding chart for obtaining a ratio of the actual loads in the internal pressures of use of the tires with respect to the load capacities. Thus, a condition in which the load acting on the tire is large (high-load condition) indicates a condition in which the actual load with respect to the load capacity for the internal pressure is not less than 100%. The larger the value for the actual load is, the larger the applied load will be.

In the present embodiment, when performing prediction of abnormalities of tires, prediction of occurrences of abnormalities to tires might be precisely performed by adding influences of running speed of the vehicle in order to further improve the accuracy of judgment. The object thereof is to prevent occurrences of erroneous alarms on rough road surfaces by taking into consideration that variations in rotational velocities of the tires are influenced by road surface conditions and that high speed running is limited to speedways of which road surfaces are relatively smooth.

Thus, rotational pulses of the tires of the vehicle during running are respectively detected for each of the four wheels which are input as rotational information for the respective tires whereupon an average value of the rotational speeds of the four wheels (running speed of the vehicle) V is compared with a reference speed Vo for judging the running speed to determine whether the running speed V of the vehicle is not more than the reference speed Vo, that is, whether $V \leq Vo$ is satisfied or not. In case $V \leq Vo$ is satisfied, an amount of fluctuations in rotational pulse intervals of a single rotation of the tires are calculated on the basis of the rotational information of the respective tires which are indexed as irregularities in rotations of a single rotation of the tires, and the irregularities in rotations of the running tires are observed to determine, on the basis of the changes in the irregularities of rotations, whether the load capacities of the tires have been exceeded or not.

It should be noted that for accurately acquiring information concerning irregularities in rotations which are the data processed for each single rotation, it is preferable to store data when running at a constant speed, for instance, such data under a condition in which the acceleration of the vehicle is regarded to satisfy $|G|<0.1$.

Figure 6:
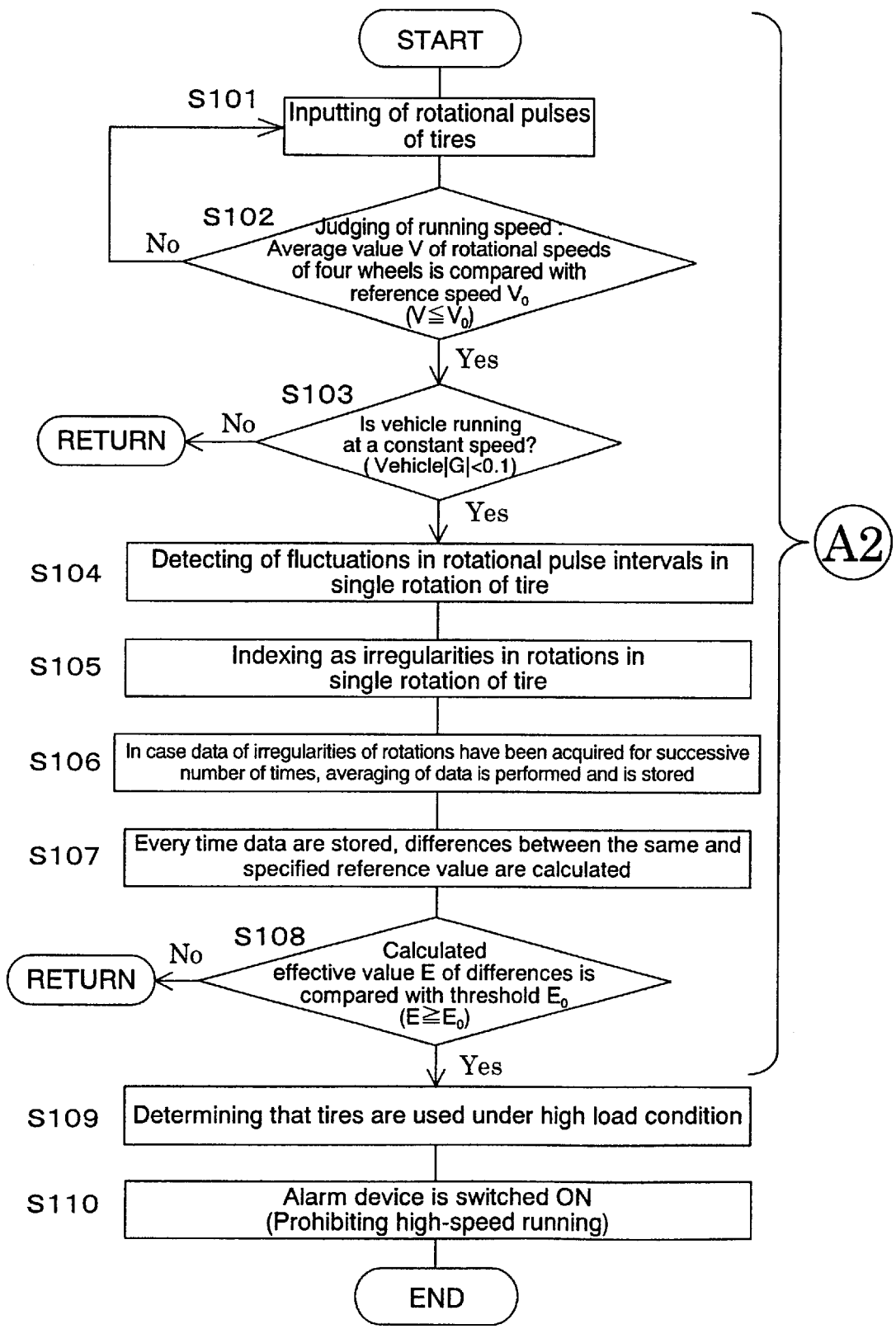
FIG. 6 is an example of a flowchart according to another embodiment of the present invention.

The method for detecting abnormalities of a tire according to another embodiment of the present invention will now be explained with reference to FIGS. 6 to 8. As illustrated in FIG. 6, wheel speed signals of the wheels are first detected whereupon rotational pulses of the tires of the vehicle are input to the CPU (Step S101). The current running speed V of the vehicle is compared with the reference speed Vo, for instance, 100 km/h, and it is determined whether $V \leq Vo$ is satisfied or not (Step S102). In case $V \leq Vo$ is satisfied, it is determined whether the vehicle is in a condition in which it is running at constant speed, and when the acceleration of the vehicle is regarded to satisfy $|G|<0.1$, an amount of fluctuations in rotational pulse intervals in a single rotation of the tires are calculated (Steps S103, S104). The values of fluctuation are indexed as irregularities in rotations of a single rotation of the tires (Step S105). In case data of irregularities in rotations have been acquired for a successive number of times, averaging of data corresponding to, for instance, 10 times is performed and accordingly stored, and every time data are stored, differences between the same and the specified reference value are calculated (Steps S106, S107). The specified reference value represents irregularities in rotations of a single rotation of the respective tires when running at normal internal pressure and normal load, which is preliminarily stored. Differences between index values of respective irregularities in rotations for the respective 48 gears of rotation and index values for 48 gears with respect to the preliminarily stored reference value are obtained. Differences of 48 irregularities in rotations are thus indexed. By calculating absolute values of the 48 differences, the actual value E of differences in irregularities of rotations is calculated.

On the basis of the actual value E of difference as calculated, a threshold $E_0$ is obtained by preliminarily checking amounts of increase in the actual values of the respective tire sizes when the load ratio has been exceeded by, for instance, 30%, and by determining alarm levels in accordance with types of the vehicle whereupon the amount of increase in the actual value is set as the threshold $E_0$. The following explanations will be made on the basis of an exemplary case in which the tire size is 205/55R16 and the load ratio is exceeding 30%. According to the yearbook of 2001 issued by JATMA, the load capacity is 425 kg when the internal pressure is 140 kPa. Thus, the load ratio is exceeded by 30% when the load becomes 553 kg at the internal pressure of 140 kPa. The actual value E is compared with the threshold $E_0$ (Step S108), and in case $E \geq E_0$ is satisfied, it is determined that the tires are used under a high load condition (Step S109). The alarm device is then switched ON and an alarm of warning (prohibiting high-speed running) is issued to inform the driver that no high-speed running should be made since high-speed running is dangerous. The driver accordingly terminates the vehicle to confirm the tire air-pressure and the amount of load.

Figure 7:
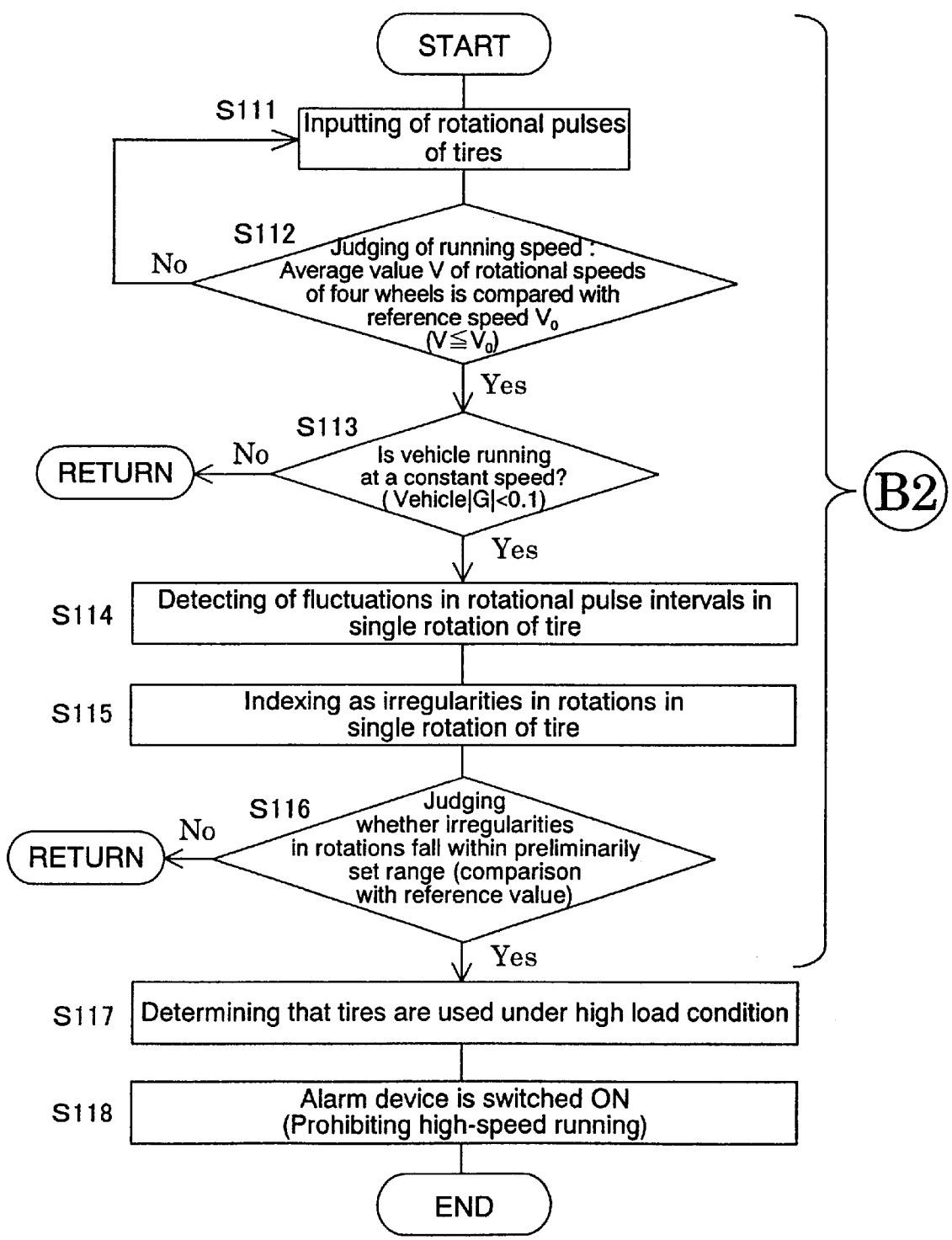
FIG. 7 is another example of a flowchart according to another embodiment of the present invention.

As illustrated in FIG. 7, rotational pulses of tires of the vehicle are input similarly to Steps S101 to S104 of the process steps of FIG. 6, and indexing of an amount of fluctuations in rotational pulse intervals is performed as irregularities in rotations (Steps S111 to S115). A comparison is performed with the reference value for judging whether the obtained irregularities in rotations fall within a preliminarily set range for the irregularities in rotations (Step S116). For instance, analysis of rotational degrees is performed for a single rotation (48 gears) for calculating actual values from primary to fifth-degree components. It is then determined whether either one of these exceeds a threshold which is a prescribed value (reference value) for the degree components, and in case the threshold has been exceeded, it is determined that the tires are used in high-load conditions (Step 117). The alarm device is switched ON and an alarm of warning (prohibiting high-speed running) is issued to inform the driver that no high-speed running should be made since high-speed running is dangerous (Step S118).

Figure 8:
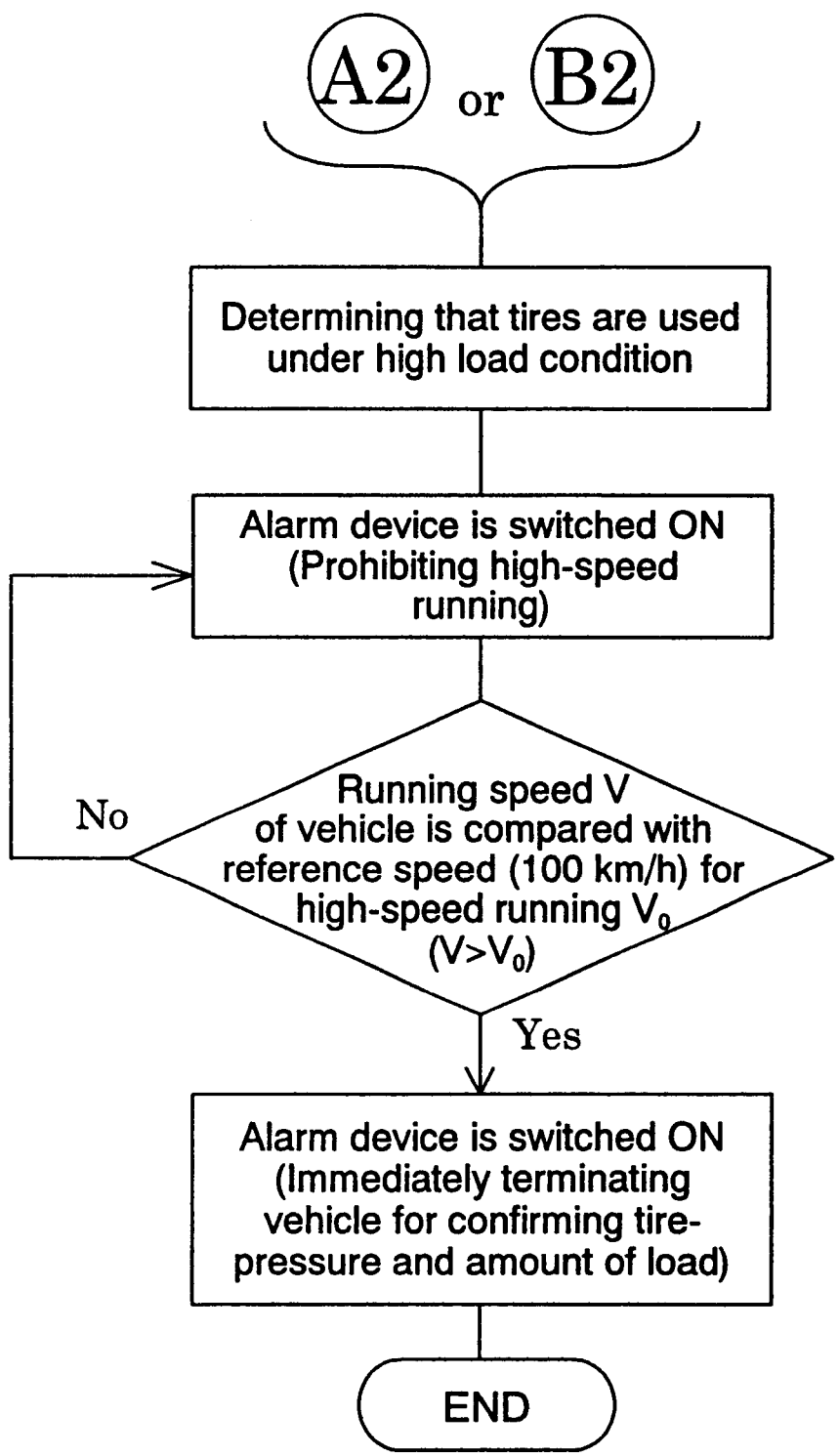
FIG. 8 is still another example of a flowchart according to another embodiment of the present invention.

As illustrated in FIG. 8, while it is determined that the tires are used in high-load conditions following the process step A2 as illustrated in FIG. 6 or the process step B2 as illustrated in FIG. 7 so that the alarm device is switched ON, it is possible to further provide a reference for judgment for the running speed of the vehicle to change contents of the alarm depending on the running speed. When the vehicle is already running at a high-speed, that is, when the running speed V of the vehicle has exceeded the reference speed for high-speed running Vo, for instance, 100 km/h, the alarming device is switched ON, heavy danger is predicted and an alarm issued to terminate high-speed running. With this arrangement, the driver might immediately terminate the vehicle for confirming the tire air-pressure and amount of load.

In case these calculations are performed for all tires of the four wheels to detect abnormalities, it is possible to generate a signal for designating a position at which the tire in question is attached in addition to the alarm of abnormalities.

As explained so far, according to one aspect of the present invention, abnormalities occurring (or are likely to occur) to a tire can be predicted on the basis of rotational pulses obtained from the rotations of the tires. More particularly, irregularities in rotational information of rotational pulses in a single rotation of the tires are detected for predicting a danger of abnormalities occurring to the tires to thus enable safe driving.

According to another aspect of the present invention, an amount of fluctuations in rotational pulses in a single rotation of the tires are detected on the basis of wheel speed signals of wheels of the vehicle running at a normal driving speed whereupon it is determined, on the basis of changes in the amount of fluctuations, whether the load capacity of the tires has been exceeded or not, and in case it is determined that the load condition for the tires is large, a danger of abnormalities occurring to the tires is predicted for accordingly alarming the driver not to perform high-speed running, so that it is possible to perform safe driving.

What is claimed is:

1. A method for detecting abnormalities of a tire which detects abnormalities of a tire on the basis of rotational information obtained from tires attached to wheels of a vehicle, comprising the steps of: detecting rotational pulses of wheels of the tires, calculating and storing rotational information of the tires on the basis of the rotational pulses, calculating and processing fluctuations in rotational pulse intervals in a single rotation of the tires on the basis of the rotational information, and storing data during driving which have been processed for each single rotation and performing prediction of abnormalities of a tire on the basis of changes in the data.

2. The method of claim 1, wherein information concerning irregularities in rotations which are the data processed per single rotation is stored under a condition in which it is regarded that the vehicle is running at a constant speed.

3. The method of any one of claims 1 to 2, wherein the changes in irregularities are obtained by a waveform process for calculating actual values of differences obtained by comparing waveforms and comparing the same with a reference value; a waveform process for calculating degrees of differences between maximum values and minimum values and comparing the same; or a waveform process means for performing analysis of degrees accompanying the rotation for comparing the degree components.

4. The method of any one of claims 1 to 2, wherein the changes in data are obtained by a process comparing with preliminarily set peak-to-peak amplitude values or prescribed values of degree components.

5. The method of any one of claims 1 to 4, wherein influences of running speed of the vehicle is additionally taken into consideration when performing prediction of abnormalities of tires.

6. An apparatus for detecting abnormalities of a tires which detects abnormalities of a tire on the basis of rotational information obtained from tires attached to wheels of a vehicle, comprising: a rotational information detecting means for detecting rotational pulses of wheels of the tires; a calculating and storing means for calculating and storing rotational information of the tires on the basis of the rotational pulses; a processing means for calculating and processing fluctuations in rotational pulse intervals in a single rotation of the tires on the basis of the rotational information; and an abnormality detecting means for storing data during driving which have been processed for each single rotation and performing predictions of abnormalities of a tire on the basis of changes in the data.

7. The apparatus of claim 6, wherein the abnormality detecting means comprises, for obtaining the changes in data, a waveform processing means for calculating actual values of differences obtained by comparing waveforms and comparing the same with a reference value; a waveform processing means for calculating degrees of differences between maximum values and minimum values and comparing the same; or a waveform processing means for performing analysis of degrees accompanying the rotation for comparing the degree components.

8. The apparatus of claim 6, wherein the abnormality detecting means comprises a comparing means for comparing changes in data with preliminarily set peak-to-peak amplitude values or prescribed values of degree components.

9. A program for detecting abnormalities of a tire, which makes a computer function, for predicting abnormal conditions of a tire, as a calculating and storing means for calculating and storing rotational information of tires on the basis of the rotational pulses, a processing means for calculating and processing fluctuations in rotational pulse intervals in a single rotation of the tires on the basis of the rotational information, and an abnormality detecting means for storing data during driving which have been processed for each single rotation and performing predictions of abnormalities of a tire on the basis of changes in the data.

10. A method for detecting abnormalities of a tire which detects abnormalities of a tire on the basis of rotational information obtained from tires attached to wheels of a vehicle, comprising the steps of: detecting rotational pulses of wheels of the respective tires; calculating and storing rotational information of the tires on the basis of the rotational pulses; comparing whether a running speed of the vehicle is not more than a reference speed or not; calculating and processing an amount of fluctuations in rotational pulse intervals in a single rotation of the tires on the basis of the rotational information; comparing, in case the running speed of the vehicle is not more than the reference speed, the processed data with a specified reference value to determine whether the data fall within a preliminarily set range for the data; and predicting, on the basis of the determination of the comparison, that a danger exists that abnormalities are likely to occur to a tire during high speed running and accordingly issuing an alarm.

11. A method for detecting abnormalities of a tire which detects abnormalities of a tire on the basis of rotational information obtained from tires attached to wheels of a vehicle, comprising the steps of: detecting rotational pulses of wheels of the respective tires; calculating and storing rotational information of the tires on the basis of the rotational pulses; comparing whether a running speed of the vehicle is not more than a reference speed or not; calculating and processing an amount of fluctuations in rotational pulse intervals in a single rotation of the tires on the basis of the rotational information; storing data during driving that have been processed for each single rotation; comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; and predicting, on the basis of the determination of the comparison, that a danger exists that abnormalities are likely to occur to a tire during high speed running and accordingly issuing an alarm.

12. The method of any one of claims 10 to 11, wherein the method further includes the steps of: comparing whether the running speed of the vehicle has exceeded a reference for high-speed running and predicting heavy dangers so as to terminate high-speed running in case the running speed of the vehicle exceeds the reference for high-speed running.

13. An apparatus for detecting abnormalities of a tire which detects abnormalities of a tire on the basis of rotational information obtained from tires attached to wheels of a vehicle, comprising: a detecting means for detecting rotational pulses of wheels of the respective tires; a calculating and storing means for calculating and storing rotational information of the tires on the basis of the rotational pulses; a speed comparing means for comparing whether a running speed of the vehicle is not more than a reference speed or not; a fluctuation processing means for calculating and processing an mount of fluctuations in rotational pulse intervals in a single rotation of the tires on the basis of the rotational information; a reference value comparing means for comparing the processed data with a specified reference value for determining, in case the running speed of the vehicle is not more than the reference speed, whether the data fall within a preliminarily set range for the data; an abnormality predicting means for predicting, on the basis of the determination of the comparison, that a danger exists that abnormalities are likely to occur to a tire when performing high speed running; and an alarming means for issuing an alarm.

14. An apparatus for detecting abnormalities of a tire which detects abnormalities of a tire on the basis of rotational information obtained from tires attached to wheels of a vehicle, comprising: a detecting means for detecting rotational pulses of wheels of the respective tires; a calculating and storing means for calculating and storing rotational information of the tires on the basis of the rotational pulses; a speed comparing means for comparing whether a running speed of the vehicle is not more than a reference speed or not; a fluctuation processing means for calculating and processing an amount of fluctuations in rotational pulse intervals in a single rotation of the tires on the basis of the rotational information; a storing means for storing data which have been processed for each single rotation during running; a threshold comparing means for comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; an abnormality announcing means for predicting, on the basis of the determination of the comparison, that a danger exists that abnormalities are likely to occur to a tire when performing high speed running; and an alarming means for issuing an alarm.

15. The apparatus of any one of claims 13 to 14, wherein the apparatus further includes a second speed comparing means for comparing whether the running speed of the vehicle has exceeded a reference for high-speed running and a second abnormality announcing means for predicting heavy dangers so as to terminate high-speed running in case the running speed of the vehicle exceeds the reference for high-speed running.

16. A program for detecting abnormalities of a tire, which makes a computer function, for predicting abnormal conditions of tires, as a calculating and storing means for calculating and storing rotational information of the tires on the basis of the rotational pulses; a speed comparing means for comparing whether a running speed of the vehicle is not more than a reference speed or not; an fluctuation processing means for calculating and processing an amount of fluctuations in rotational pulse intervals in a single rotation of the tires on the basis of the rotational information; a reference value comparing means for comparing the processed data with a specified reference value in case the running speed of the vehicle is not more than the reference speed, whether the processed data fall within a preliminarily set range for the data or not; and an abnormality predicting means for predicting, on the basis of the determination of the comparison, that a danger exists that abnormalities are likely to occur to a tire when performing high speed running, and issuing an alarm.

17. A program for detecting abnormalities of a tire, which makes a computer function, for predicting abnormal conditions of tires, as a calculating and storing means for calculating and storing rotational information of the tires on the basis of the rotational pulses; a speed comparing means for comparing whether a running speed of the vehicle is not more than a reference speed or not; a fluctuation processing means for calculating and processing an amount of fluctuations in rotational pulse intervals in a single rotation of the tires on the basis of the rotational information; a storing means for storing processed data per single rotation during running; a threshold comparing means for comparing a compared value, which has been obtained by comparing fluctuations in rotational pulse intervals in a single rotation of the tires at the time the vehicle performs low speed running with the stored data, with a threshold for indicating a load condition of the tire, in case the running speed of the vehicle is not more than the reference speed; and an abnormality predicting means for predicting, on the basis of the determination of the comparison, that a danger exists that abnormalities are likely to occur to a tire when performing high speed running and accordingly issuing an alarm.

18. The program of any one of claims 16 to 17, wherein the computer is made to function as a second speed comparing means for comparing whether the running speed of the vehicle has exceeded a reference for high-speed running and a second abnormality announcing means for predicting heavy dangers so as to terminate high-speed running in case the running speed of the vehicle exceeds the reference for high-speed running.

* * * * *